United States Patent
Chen et al.

(10) Patent No.: US 8,578,116 B2
(45) Date of Patent: Nov. 5, 2013

(54) SYSTEM AND METHOD FOR MEMORY DATA PROTECTION WITH SECURE PAD MEMORY

(75) Inventors: Xuemin Chen, San Diego, CA (US); Stephane W. Rodgers, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 337 days.

(21) Appl. No.: 11/393,164

(22) Filed: Mar. 28, 2006

(65) Prior Publication Data

US 2007/0233982 A1  Oct. 4, 2007

(51) Int. Cl.
*G06F 12/00* (2006.01)

(52) U.S. Cl.
USPC .... 711/163; 711/167; 711/159; 711/E12.051; 711/E12.069; 713/193

(58) Field of Classification Search
USPC .......................................... 711/163; 713/193
See application file for complete search history.

(56) References Cited

U.S. PATENT DOCUMENTS

| | | | | |
|---|---|---|---|---|
| 4,773,048 A | * | 9/1988 | Kai | 365/230.03 |
| 4,888,773 A | * | 12/1989 | Arlington et al. | 714/764 |
| 5,191,610 A | * | 3/1993 | Hill et al. | 380/262 |
| 5,276,312 A | * | 1/1994 | McCarthy | 463/26 |
| 5,506,968 A | * | 4/1996 | Dukes | 710/240 |
| 5,870,622 A | * | 2/1999 | Gulick et al. | 712/35 |
| 6,272,223 B1 | * | 8/2001 | Carlson | 380/251 |
| 6,467,009 B1 | * | 10/2002 | Winegarden et al. | 710/305 |
| 6,480,831 B1 | * | 11/2002 | Cordery et al. | 705/60 |
| 6,578,061 B1 | * | 6/2003 | Aoki et al. | 708/520 |
| 2005/0050344 A1 | * | 3/2005 | Hull et al. | 713/193 |

* cited by examiner

*Primary Examiner* — Reginald Bragdon
*Assistant Examiner* — Hamdy S Ahmed
(74) *Attorney, Agent, or Firm* — Sterne, Kessler, Goldstein & Fox, PLLC

(57) ABSTRACT

A system and a method for protecting the security of data stored externally to a data processing engine of a data processor using at least one secure pad memory that is mapped to internal memory of the data processing engine and to the external memory. The memory data protection system and method performs an arithmetic operation, such as a bitwise exclusive OR ("XOR") operation, on data being read from the data processing engine or written to the external memory using data stored in secure pads of the secure pad memory, which data may be random numbers generated by a random number generator.

26 Claims, 4 Drawing Sheets

SYSTEM AND METHOD FOR MEMORY DATA PROTECTION WITH SECURE PAD MEMORY

BACKGROUND OF THE INVENTION

1. Field of the Invention

The invention relates to data storage in computer memory, and in particular to a system and a method of providing protection to multimedia data stored in computer memory.

2. Description of the Related Art

As the range of applications and services provided by embedded systems, mobile communication devices, and consumer products expands, there is a corresponding increase in concerns about the security of the data used in these applications and services. Because of the large volume of data being processed, most of these embedded systems, mobile communication devices, and consumer products (for example, pay-TV, PDAs, mobile phones, cell phones, set-top boxes, point-of-sale systems, etc.) make use of external memory. As a result, there is a potential security problem in that data and software are constantly exchanged between external memory ("RAM") and the memory controller in clear form, i.e., unencrypted, on the controller-memory bus. This data and software may contain confidential or proprietary data, such as commercial software or private contents, that either the end-user or the content provider wishes to protect from unauthorized dissemination.

These applications and services, in particular, broadband multimedia services, may be supported by configurable System-On-a-Chip ("SoC") platforms, whose final implementation may be in an Application-Specific Integrated Circuit ("ASIC") or a Field Programmable Gate Array ("FPGA") in order to achieve high data throughput in a small package at low cost. As an example, one type of broadband multimedia application is the set-top box ("STB"), a device that needs to process concurrent streams of audio and video data associated with broadband multimedia services, as well as network packets processed in support of high-speed Internet access.

In many cases, the confidentiality of this software and data is highly desirable, if not absolutely necessary: end-user private data must be kept confidential, and unauthorized software use must be avoided, etc. Unfortunately, the amount of memory needed for these platforms requires the use of external memories for storing software and data, usually in unencrypted form. As a result, the controller-memory bus becomes the weak link in the system, potentially vulnerable to hackers who are able to observe both memory content and system execution through simple board-level probing at a relatively small cost.

There are various approaches that may be utilized to protect the data in the main memory. A known approach to protect the data is cryptography, which may be either symmetric cryptography (i.e., private-key cryptography) or asymmetric cryptography (i.e., public-key cryptography). Examples of symmetric cryptography are DES (Data Encryption Standard), triple-DES, and AES (Advanced Encryption Standard). Asymmetric cryptography uses both a public key and a private key, and generally requires more processing power and memory than a comparable symmetric cryptography system.

One implementation of this approach adds a high-speed and low-latency encryption/decryption engine in the memory controller. However, this is not always easily implemented, especially when low-latency is a requirement, because the standard algorithms, e.g., DES and AES, present their own set of problems—namely the latency induced in the pipeline because of the multiple passes required, which may cause throughput to decrease significantly. For this reason, a scrambling scheme that induces minimum pipeline latency is highly desirable. Another solution may be to develop low-latency scramblers in the memory controller. However, such scramblers may not have sufficient encryption capability and may be easily broken by hackers.

Therefore, there is a need for a system and a method of transmitting software and data between the memory controller and external memory in a secure manner, without a reduction in throughput, that is capable of implementation on small, efficient, low cost platforms such as fully-integrated ASICs and FPGAs.

SUMMARY

A system and a method for protecting the security of data stored externally to a data processing engine of a data processor are disclosed. The memory data protection system may include a data processing engine having its own internal memory, an external main memory, and at least one secure pad memory with a pre-defined mapping to the internal memory of the processing unit and the main memory. The memory data protection system may also include a security processor that may include a random number generator.

In an example of operation, when the data processing engine reads a word from, or writes a word to, the main memory, a bitwise exclusive OR ("XOR") operation is performed on the read or written word, as the case may be, with random numbers stored in the secure pad memory to descramble/scramble the data read from/written to the main memory. Because the number of secure pads in the secure pad memory may be much less than the number of main memory blocks, the main memory blocks may be mapped to the secure pad memory in such a way as to provide aliasing of secure pads to memory blocks when the memory block index exceeds the number of secure pads. The secure pad memory may be implemented with on-chip RAM or with a plurality of registers.

In place of the XOR operation, the memory data protection system may use more complex arithmetic operations. And the random number generator may be replaced by a pseudo-random number generator, such as, for example, a hash function or a crypto (encryption/decryption) engine. In this case, the pseudo-random number generator may use a true random number as a seed.

Various advantages, aspects and novel features of the present invention, as well as details of an illustrated implementation thereof, will be more fully understood from the following description and drawings.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
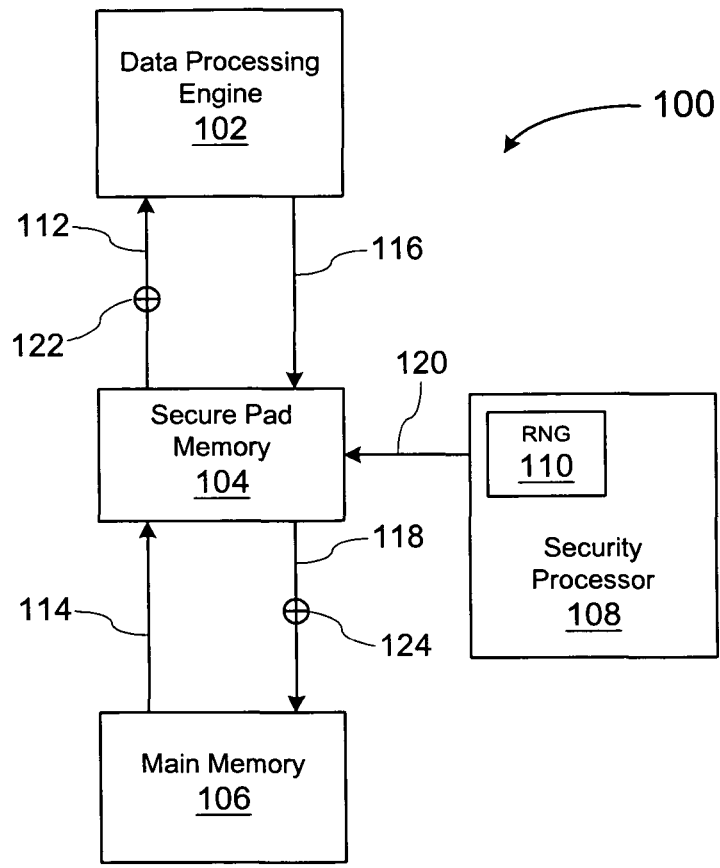
FIG. 1 shows a block diagram of an example of an implementation of a memory data protection system ("MDPS").

In the following description, reference is made to the accompanying drawings that form a part hereof, and that show, by way of illustration, a specific implementation in which the invention may be practiced. Other examples of implementation may be utilized and structural changes may be made without departing from the scope of the present invention.

A memory data protection system ("MDPS") and a method of protecting data in a data processor are disclosed. The MDPS may include a data processing engine having its own internal memory, a main memory off-chip, at least one secure pad memory with a pre-defined mapping to the main memory, and a security processor that may include a random number generator. The MDPS may also include at least one secure pad memory with a pre-defined mapping to the internal memory of the data processing engine.

In an example of operation, when the data processing engine reads a word from, or writes a word to, the main memory, a bitwise exclusive OR ("XOR") operation is performed on the read or written word, as the case may be, with random numbers stored in the secure pad memory to descramble/scramble the data read from/written to the main memory. Because the number of secure pads in the secure pad memory may be much less than the number of main memory blocks, the main memory blocks may be mapped to the secure pad memory in such a way as to provide aliasing of secure pads to memory blocks when the memory block index exceeds the number of secure pads. The secure pad memory may be implemented with on-chip RAM or with a plurality of registers.

This invention also allows for the use of multiple secure pad memories in any one single application. As an example, a multimedia processing application, such as a set-top box ("STB"), may have several processing elements or processing units ("PUs") that may be implemented on a single SoC. There may be, for example, multiple PUs for applications such as audio and video decoding, voice-over-IP ("VoIP"), video-on-demand ("VoD"), pay-per-view ("PPV") video programming, and personal video recording ("PVR"). The SoC may also include an on-chip memory controller and a memory scheduler subsystem.

Thus, secure memory pads may be placed in multiple PUs within the same SoC. The secure memory pads in a processing chain may also be paired up. For example, in a video decoding process, the transport stream that carries compressed video may first be sent to the transport processing unit for demultiplexing and the resulting (compressed) video stream will be XORed with a secure memory pad in the transport processing unit and then sent to the (external) memory. In the reverse process, the video decompression decoder will receive this (compressed) video data and using its own secure memory pad that is paired with the transport processing unit secure memory pad (i.e., both secure memory pads are loaded with the same random numbers by the security processor) will descramble, i.e., XOR, the video data to obtain the clear (compressed) video data for decompression. Based on this example, each on-chip PU may have its own secure memory pads and the secure memory pads need not be in the memory controller.

FIG. 1 shows a block diagram of an example of an implementation of an MDPS 100 that includes a data processing engine 102, a secure pad memory 104, and a main memory 106. The data processing engine 102 may be any microprocessor, general-purpose processor, combination of processors, digital signal processor ("DSP"), Field Programmable Gate Array ("FPGA"), and/or application-specific integrated circuit ("ASIC") that controls and processes data. This data, referred to as the "processed data," may be any type of data processed by a data processing engine, for example, video data, audio data, VoIP packets, etc. The processed data, after completion of the processing by the data processing engine, is stored in the main memory allocated to that particular data processing engine.

The security processor 108 is in signal communication with the secure pad memory 104 via signal path 120. The security processor 108 may include a random number generator ("RNG") 110, which generates random numbers that may be pre-loaded into the secure pad memory 104. The security processor 108 may also be configured to change the random numbers every power cycle and different random numbers may be assigned to each client, such as, for example, the CPU, video decoder, audio decoder, PDA, etc.

In an example of operation, processed data is read from the internal memory (not shown) of data processing engine 102 into the secure memory pad 104 via signal path 116, where the data is "scrambled" by performing an XOR operation with XOR gate 124 on the processed data and a random number in the secure pad memory 104 that is mapped to the main memory using the address in main memory where the scrambled data will be written. The scrambled data is then written into the main memory 106 via signal path 118.

For reading data stored in the main memory 106, the process is reversed and the stored data is read from main memory 106 to the secure memory pad 104, using signal path 114, and in the secure memory pad 104, the XOR operation is performed on the stored data to "descramble" the stored data by XOR gate 122. The descrambled data is then read to the internal memory (not shown) of data processing engine 102 via signal path 112.

Signal paths 112, 114, 116, and 118 may form all or a portion of the memory-processor bus for the MDPS 100. Moreover, as noted above, the data processing engine 102 may have multiple PUs within the same SoC, in which case each PU may have its own secure memory pad. For example, the process for writing processed data to external memory described above may include video demultiplexing and compressing, and the XOR operation may be performed in secure pad memory placed within the PU performing these functions. The reverse process may be carried out by another PU with its own secure pad memory, where both secure pad memories are paired up, i.e., both are loaded with the same random numbers simultaneously.

Figure 2:
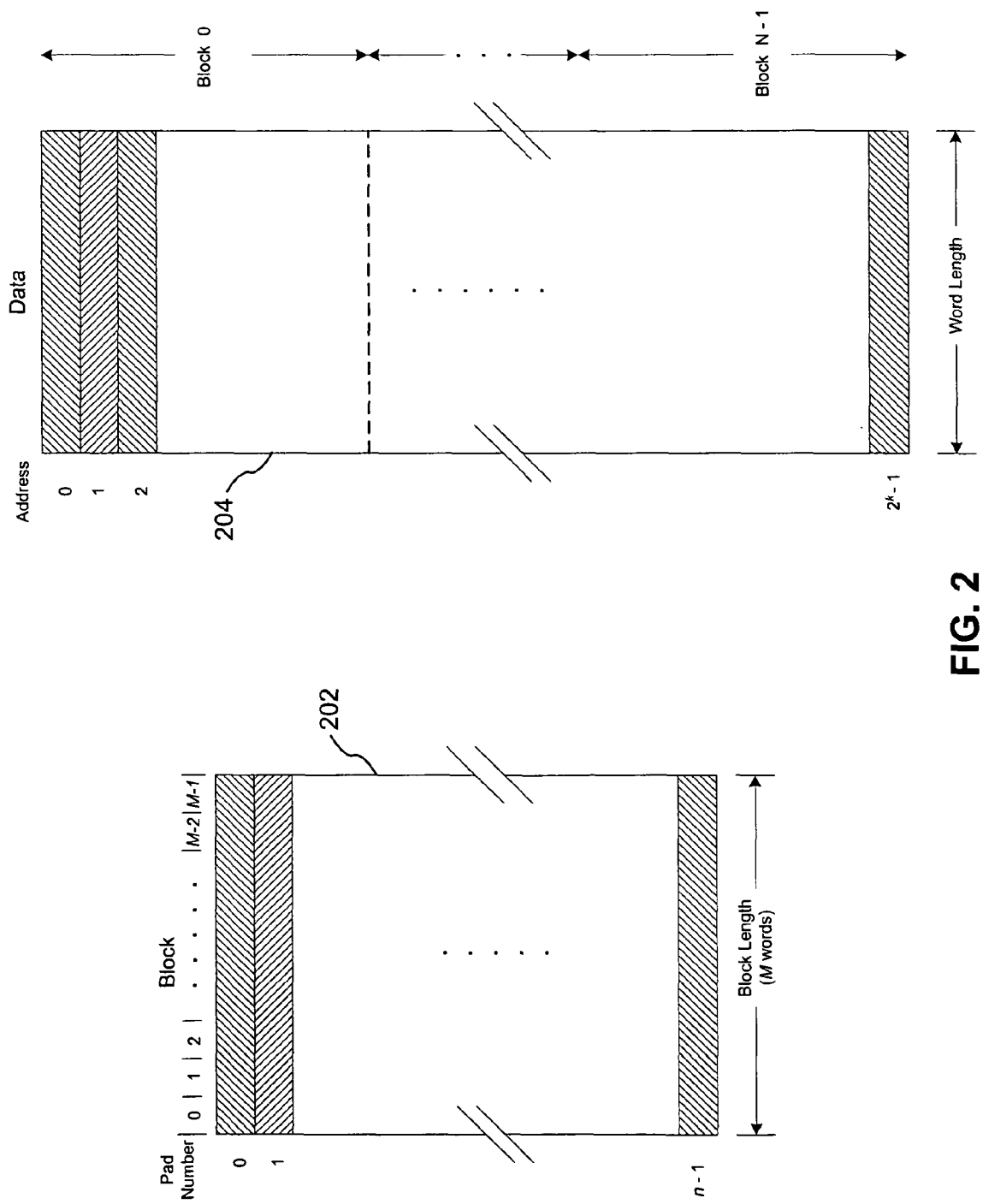
FIG. 2 shows a schematic diagram of an example of data structures for a secure pad memory and a main memory and the mapping of main memory blocks into secure pads of the secure pad memory of an MDPS.

FIG. 2 shows a schematic diagram of an example of a data structure for a secure pad memory 202 and a main memory 204 and an example implementation of the mapping of main memory blocks into secure pads of the secure pad memory. The main memory 204 may include up to $2^k$ addressable words (or bytes), with each word (or byte) having a unique k-bit address. For mapping purposes, this memory may be considered to consist of a number of fixed-length blocks, N, of M words (or bytes) each. That is, there are N blocks in main memory 204, each containing M words (or bytes), where $$N = \frac{2^k}{M}$$

(assume that $2^k$ is divisible by M).

As for secure pad memory 202, it may include n secure pads of M words (or bytes) each, where n<<N. N is divisible by n, and each pad is numbered sequentially from 0 through n−1. If a word (or byte) in a block of memory is to be read from or written to the main memory 204, that block is transferred and XORed to one of the secure pads of the secure pad memory 202. Because there are considerably fewer secure pads than main memory blocks, a method may be used to map each block of main memory into one, and only one, secure pad.

An example of a method for mapping each block of main memory into a secure pad may be as follows:

i=j mod n, where
i=secure pad number,
j=main memory block number, and
n=number of secure pads.

This method for mapping may be implemented using the address of the block in main memory to be read/written. The effect of this method is that blocks of main memory are assigned to the secure pads as shown in the following table:

TABLE 1

Mapping between the secure pad memory and the main memory.

| Secure Pad | Main Memory Block Assigned |
|---|---|
| 0 | 0, n, . . . , N − n |
| 1 | 1, n + 1, . . . , N − n + 1 |
| . . . | . . . |
| n − 1 | n − 1, 2n − 1, . . . , N − 1 |

Table 1-Mapping between the secure pad memory and the main memory.

Thus, the use of a portion of the, address as a pad number provides a unique mapping of each block of the main memory 204 into the secure pad memory 202. A similar mapping may be used between the internal memory of the data processing engine 102, FIG. 1, and the secure pad memory 202. The internal memory may include up to $2^m$ addressable words (or bytes), with each word (or byte) having a unique m-bit address. For mapping purposes, this memory may be considered to include a number of fixed-length blocks, P, of M words (or bytes) each. That is, there are P blocks in the internal memory, each containing M words (or bytes), where $$P = \frac{2^m}{M}$$

(assume that $2^m$ is divisible by M), as shown in the following table:

TABLE 2

Mapping between the secure pad memory and the internal memory (of the data processing engine).

| Secure Pad | Internal Memory Block Assigned |
|---|---|
| 0 | 0, n, . . . , P − n |
| 1 | 1, n + 1, . . . , P − n + 1 |
| . . . | . . . |
| n − 1 | n − 1, 2n − 1, . . . , P − 1 |

Figure 3:
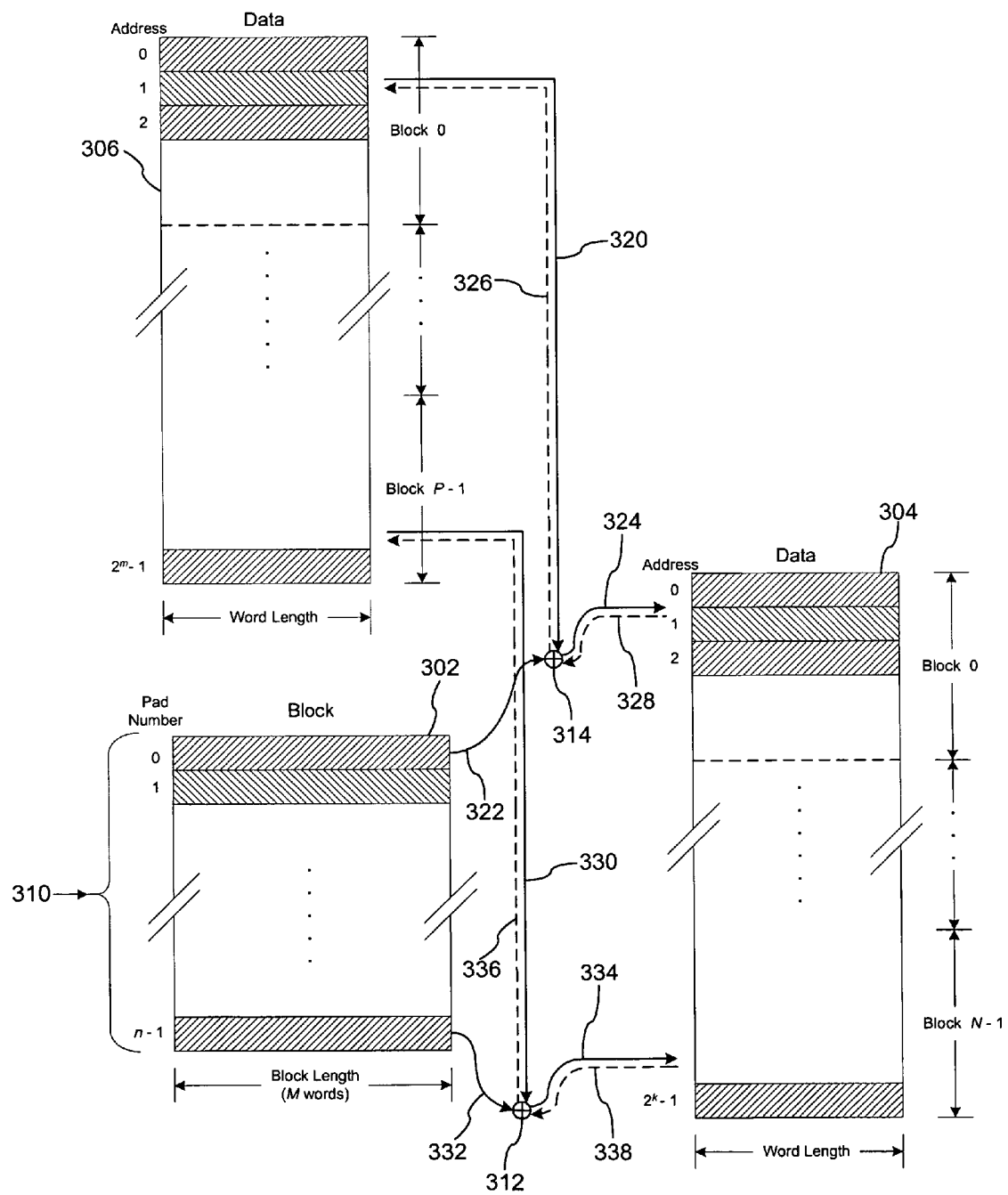
FIG. 3 shows a schematic diagram of an example of data structures for a secure pad memory, a main memory, and an internal memory of a data processing engine, together with signal flow lines showing the mapping of main memory and internal memory blocks into secure pads of the secure pad memory.

FIG. 3 shows a schematic diagram of an example of data structures for a secure pad memory 302, a main memory 304, and an internal memory 306 of a data processing engine, and the mapping of main memory blocks and data processing blocks into secure pads of the secure pad memory 302 in accordance with the mapping shown in Tables 1 and 2. As in FIG. 2, the main memory 304 may include up to $2^k$ addressable words (or bytes), with each word (or byte) having a unique k-bit address. For mapping purposes, this memory is considered to consist of a number of fixed-length blocks, N, of M words (or bytes) each, numbered sequentially from 0 to N−1. That is, there are N blocks in main memory 204, each containing M words (or bytes), where $$N = \frac{2^k}{M}$$

(assume that $2^k$ is divisible by M).

As shown in Table 2, the internal memory 306 of the data processing engine may consist of up to $2^m$ addressable words (or bytes), with each word (or byte) having a unique m-bit address. For mapping purposes, this memory is considered to consist of a number of fixed-length blocks, P, of M words (or bytes) each, numbered sequentially from 0 to P−1. That is, there are P blocks in internal memory 306 of the data processing engine, each containing M words (or bytes), where $$P = \frac{2^m}{M}$$

(assume that $2^m$ is divisible by M). Again, as in FIG. 2, the secure pad memory 302 may have n secure pads of M words (or bytes) each, where n<<N, N is divisible by n, and each pad is numbered sequentially from 0 through n−1.

In an example of operation, a multimedia processor (not shown) has to write a block of processed data to its main memory. In FIG. 3, this operation is graphically represented by signal flow paths 320, 322, and 324. In signal flow path 320, block 0 of internal memory 306 of the data processing engine, having M words (or bytes) of data, is input to XOR gate 314. Also input to XOR gate 314 along signal path 322 is the random number having a length of M words that is stored in secure pad 0 of the secure pad memory 302, the secure pad memory 302 having been preloaded with random numbers via signal flow path 310 by a security processor (not shown). At XOR gate 314, the XOR operation is performed on block 0 from the internal memory 306 and the random number from secure pad 0 of the secure pad memory 302, thus, in effect, "scrambling" the data block. The scrambled data is then written to block 0 of the main memory 304 via signal flow path 324.

A similar operation is graphically represented by signal flow paths 330, 332, and 334, with the exception that the last block of the internal memory 306, block P−1, is input to XOR gate 312 together with the random number that is stored in secure pad n−1. At XOR gate 312, the XOR operation is performed on block P−1 from the internal memory 306 and the random number from secure pad n−1 of the secure pad memory 302, thus, in effect, "scrambling" the data block. The scrambled data is then written to block N−1 of the main memory 304 via signal flow path 334. If the memory identified by binary addresses $0^k$ and $2^k$−M is not available for blocks 0 and P−1, respectively, then the scrambled data may be written to the appropriate block of main memory 304 in accordance with Table 1.

The read operation from main memory 304 is graphically represented by signal flow paths 328, 322, and 326 for a read of block 0 from main memory 304, and by signal flow paths 338, 332, and 336 for a read of block N−1 from main memory 304. In signal flow path 328, block 0 of main memory 304, having M words (or bytes) of data, is input to XOR gate 314. Also input to XOR gate 314 along signal path 322 is the random number having a length of M words that is stored in secure pad 0 of the secure pad memory 302, the secure pad memory 302 having been preloaded with random numbers via signal flow path 310 by a security processor (not shown). At XOR gate 314, the XOR operation is performed on block 0 from main memory 304 and the random number from secure pad 0 of the secure pad memory 302, thus, in effect, "descrambling" the data block. The descrambled data is then written to block 0 of the internal memory 306 via signal flow path 326.

A similar read operation is graphically represented by signal flow paths 338, 332, and 336, with the exception that the last block of main memory 304, block N−1, is input to XOR gate 312 together with the random number that is stored in secure pad n−1 of the secure pad memory 302. At XOR gate 312, the XOR operation is performed on block N−1 from main memory 304 and the random number from secure pad n−1 of the secure pad memory 302, thus, in effect, "descrambling" the data block. The descrambled data is then written to block P−1 of the internal memory 306 via signal flow path 336. If the memory identified by binary addresses $0^k$ and $2^m$−M is not available for blocks 0 and N−1, respectively, then the descrambled data may be written to the appropriate block of internal memory 306 in accordance with Table 2.

Figure 4:
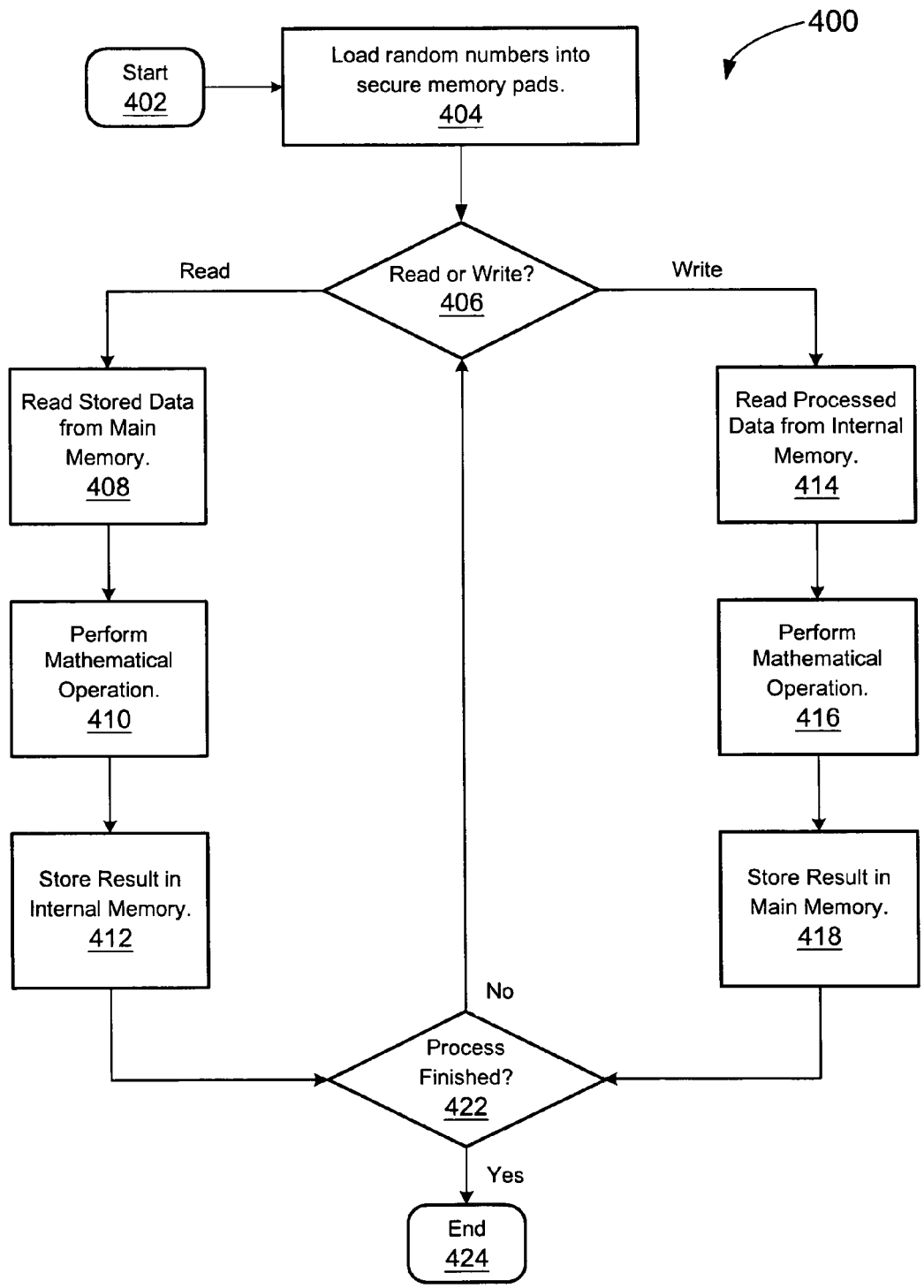
FIG. 4 shows a flow diagram of the steps performed in an example of a process of reading data from and writing data to the main memory of an MDPS using paired secure memory pads.

FIG. 4 shows a flow diagram of the steps performed in an example of a process 400 of reading data from and writing data to the main memory of an MDPS using paired secure memory pads. The process starts in step 402, which is followed by step 404, where a security processor 108, FIG. 1, selects a random number generated by RNG 110, FIG. 1, and stores that random number in a first secure pad and a second secure pad in a secure memory pad 104, FIG. 1. In decision step 406, the process determines which operation is to be performed next, which may basically be either a read or write operation. If a read operation, the MDPS in step 408 reads stored data from main memory 106, FIG. 1, and in step 410, performs a mathematical operation, e.g., an XOR operation, on the stored data from main memory 106, FIG. 1, and the random number stored in the first secure pad. Then, in step 412, the result of the mathematical operation is stored in the internal memory of the appropriate data processing engine 102, FIG. 1.

If the next operation is a write operation, the MDPS in step 414 reads processed data from the internal memory of data processing engine 102, FIG. 1, and in step 416, performs the same mathematical operation, in this case, the XOR operation, on the processed data from the internal memory, and the random number stored in the second pad. Then, in step 418, the result of the mathematical operation is written to the main memory 106, FIG. 1. In decision step 422, if the process has more data to processed, the process returns to decision step 406; otherwise, the process ends in step 424.

To minimize the latency of the MDPS, the secure pads may be implemented in hard-registers rather than memory so that there are no wasted cycles looking up the pad number (this provides a minimum latency of 1 cycle). Because hard registers are expensive in terms of gates, there is a desire to minimize the number of secure pads in this implementation. From a data security standpoint, however, it is desirable to have a large number of secure pads. Having a large number of secure pads makes it less likely that patterns will arise in the encrypted data that could be used to expose the underlying random number (i.e., entropy increases with an increasing number of pads).

For example, consider a system with a 1024×8 bit memory, divided into blocks of 32 bytes each (M=32), with 4 secure pads (n=4). In this case, N=1024/32=32. Because there are only 4 secure pads in the design, the relationship $$i = j \bmod n$$

dictates that for every $4^{th}$ block, the same secure pad will be used. If the data memory were originally filled with all zeros, this means that every $4^{th}$ block will have the exact same pattern of data, which will be the zero data XORed with the random number stored in that pad. A hacker may thus be able to deduce the original random number by recognizing repeating patterns such as this. Although this example is much smaller than a real-world system, the problem remains that from a security standpoint, it is desirable to have a larger number of pads, although this may be undesirable from a cost standpoint.

One way to alleviate this problem is to use a "partial pad." While some data addresses may still look up a secure pad directly, others may select two adjacent secure pads simultaneously—in this case, the data from both pads are XORed together, and then XORed with the data. If every even address selects a particular secure pad, while every odd address selects a combination of 2 secure pads, the effective number of secure pads has been increased by 2× without the associated hardware increase. In the example above, the data pattern would now repeat every $8^{th}$ block, instead of every $4^{th}$ block. Because the amount of truly random data has not changed, in one sense the data entropy has not increased. However, from the standpoint of what is visible to the hacker, the data appears to be repeating less often, and this reduces the likelihood of using pattern detection to derive the original key.

More sophisticated methods may be used to increase the number of "virtual pads" still further. For example, by using a rotate right on one or both secure pads, it is possible to achieve multiple virtual secure pads for every real hardware pad. In this case, the data in one of the contributing secure pads is rotated right by 1 bit for each successive address, while the other contributing secure pad is rotated left by 1 bit. When the number of bit positions has been exhausted, then the subsequent address moves on to the next secure pad.

Using the concept of rotating secure pads increases the number of virtual secure pads in the design to: V=M*P*n, where V is the number of virtual secure pads, M is the number of words in one block, P is the number of bits per word, and n is the number of physical hardware pads.

The concept of rotating secure pads may be modified still further to prevent discovery by a hacker. This modification may involve shifting a random number of bits (with the random number determined via a pseudo-random shift register pre-loaded with the data address). This modification may be used where it is felt that the linear rotating nature of the previous method is too regular. It should be noted, however, that whatever method of increasing the number of virtual pads is used, the final hardware generated should be simple enough so as not to introduce more than 1 cycle of latency. Thus the motivation is to keep the underlying method as simple as possible, while still maintaining the desired level of security.

Persons skilled in the art will understand and appreciate, that one or more processes, sub-processes, or process steps described may be performed by hardware or software, or both. Additionally, the invention may be implemented completely in software that would be executed within a microprocessor, general-purpose processor, combination of processors, DSP, or ASIC. The invention may be realized in a centralized fashion in at least one computer system, or in a distributed fashion where different elements are spread across several interconnected computer systems. If the process is performed by software, the software may reside in instruction memory in the processor. The software in instruction memory may include an ordered listing of executable instructions for implementing logical functions (i.e., "logic" that may be implemented either in digital form such as digital circuitry or source code or in analog form such as analog circuitry or an analog source such an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium", "computer-readable medium" or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires; a portable computer diskette (magnetic); a RAM (electronic); a read-only memory ("ROM") (electronic); an erasable programmable read-only memory (EPROM or Flash memory) (electronic); an optical fiber (optical); and a portable compact disc read-only memory "CDROM" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

While the present invention has been described with reference to certain embodiments, it will be understood by those skilled in the art that various changes can be made and equivalents can be substituted without departing from the scope of the present invention. It will be understood that the foregoing description of an implementation has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed:

1. A memory data protection system ("MDPS") for protecting data in a data processor, the MDPS comprising:
    at least one data processing engine configured to process data including an internal memory;
    a main memory configured to store data processed by the at least one data processing engine;
    at least one secure pad memory coupled to, and in signal communication with, both the at least one data processing engine and the main memory, wherein the at least one secure pad memory includes a plurality of secure pads, wherein the at least one data processing engine and the at least one secure pad memory are part of an integrated circuit chip, wherein the main memory is not part of the integrated circuit chip; and
    a security processor in signal communication with the secure pad memory, wherein the security processor includes a random number generator that generates a plurality of numbers, each number being sized for a secure pad of the plurality of secure pads, wherein the security processor loads the plurality of numbers into the plurality of secure pads, wherein a first content residing in a memory block from the internal memory is scrambled by a second content residing in a corresponding secure pad before being stored as third content in a corresponding block in the main memory.

2. The MDPS of claim 1, wherein the third content residing in a block in the main memory is unscrambled by the second content residing in the corresponding secure pad before being stored as the first, content in a corresponding block of the internal memory.

3. The MDPS of claim 1, wherein each block of the main memory is mapped to one secure pad of the secure pad memory.

4. The MDPS of claim 1, wherein each block of the internal memory is mapped to one secure pad of the secure pad memory.

5. The MDPS of claim 1, wherein the security processor loads a new plurality of numbers into the plurality of secure pads each cycle.

6. The MDPS of claim 1, wherein the at least one data processing engine includes a plurality of processors, wherein the at least one secure pad memory includes a plurality of secure pad memories, and wherein each processor is assigned a respective one of the secure pad memories.

7. The MDPS of claim 1, wherein a particular Hock of the internal memory and a particular block of the main memory always use the number stored in the same secure pad of the at least one secure pad memory when the internal memory and the particular block are in two-way communication.

8. The MDPS of claim 1, wherein the first content residing in a memory block from the internal memory is scrambled by the second content residing in a corresponding secure pad and a fourth content residing in another corresponding secure pad before being stored as third content in a corresponding block in the main memory.

9. The MDPS of claim 1, wherein the at least one data processing engine includes a video processor and an audio processor, wherein the at least one secure pad memory includes a first secure pad memory and a second secure pad memory, wherein the video processor is assigned to the first secure pad memory, and wherein the audio processor is assigned to the second secure pad memory.

10. The MDPS of claim 9, wherein the security processor loads a first set of numbers into the first secure pad memory, wherein the security processor loads a second set of numbers into the second secure pad memory, wherein the first set of numbers scrambles communications leaving the video processor, and wherein the second set of numbers scrambles communications leaving the audio processor.

11. The MDPS of claim 1, wherein each secure pad supports a plurality of virtual secure pads.

12. The MDPS of claim 11, wherein each of the plurality of virtual secure pads is generated as a result of a shift or rotate operation.

13. The MDPS of claim 1, wherein each block of the internal memory and each block of the main memory are mapped on a corresponding block of the corresponding secure pad of the at least one secure pad memory using a block number and a number of secure pads.

14. A method for protecting processed data stored in off-chip memory of a data processing engine, the method comprising:
    preloading a secure pad memory having at least one secure pad with predetermined data;
    receiving processed data from an internal memory of the data processing engine, wherein the secure pad memory and the data processing engine including the internal memory are part of an integrated circuit chip, wherein the off-chip memory is not part of the integrated circuit chip, wherein the predetermined data is used to scramble processed data from the internal memory before communicating the scrambled data to the off-chip memory;
    mapping each block of the internal memory to each block of the secure pad memory;
    mapping each block of the off-chip memory to each block of the secure pad memory;
    retrieving a selected portion of the predetermined data stored in the secure pad memory;
    performing a mathematical operation on the processed data from internal memory and the selected portion of the predetermined data stored in the secure pad memory;
    writing the result of the mathematical operation to the off-chip memory; and
    using contents residing in a same block in the secure pad memory when a particular block in the internal memory is in two-way communication with a particular block in the off-chip memory.

15. The method of claim 14, further including:
    receiving stored data from the off-chip memory of the data processing engine;
    retrieving a selected portion of the predetermined data stored in the secure pad memory corresponding to the predetermined data used in performing the mathematical operation when writing the received stored data to the off-chip memory;
    performing a mathematical operation on the stored data from off-chip memory and the selected portion of the predetermined data stored in the secure pad memory; and
    writing the result of the mathematical operation to the internal memory.

16. The method of claim 14, wherein the predetermined data stored in the secure pad is a random number generated by the security processor.

17. The method of claim 14, wherein each block of the internal memory and each block of the main memory are mapped on a corresponding block of the corresponding secure pad of the at least one secure pad memory using a block number and a number of secure pads, wherein a block size of the internal memory, the block size of the main memory and the block size of a secure pad are a same size.

18. The method of claim 14, wherein the mathematical operation includes different XOR operations performed on stored data with even-numbered addresses and with odd-numbered addresses.

19. The method of claim 14, wherein the mathematical operation includes an XOR operation performed with rotated random numbers.

20. The method of claim 14, wherein the mathematical operation includes an XOR operation performed using a plurality of secure pads of the secure pad memory, and wherein each secure pad has a same size as the received processed data from the internal memory and has the same size as the results written to the off-chip memory.

21. The method of claim 14, wherein each secure pad has a same size as the received processed data from the internal memory and has the same size as the results written to the off-chip memory.

22. The method of claim 14, wherein each secure pad supports a plurality of virtual secure pads.

23. A memory data protection system ("MDPS") for protecting data in a data processor, the MDPS comprising:
    a first circuit that preloads one or more secure pads of a secure pad memory with predetermined data;
    a second circuit that receives data from an internal memory of a data processor engine, wherein the secure pad memory includes a plurality of secure pads, wherein the secure pad memory and data processor engine including the internal memory are part of an integrated circuit chip, wherein an external memory is not part of the integrated circuit chip, wherein communications between the internal memory and the external memory are scrambled by the predetermined data of the secure pad memory, wherein the first circuit generates a plurality of random numbers, each number being sized for a secure pad of the plurality of secure pads, wherein the first circuit loads the plurality of random numbers into the plurality of secure pads, wherein each secure pad has a single block, wherein each block of the internal memory is mapped to each block of the secure pad memory, wherein each block of the external memory is mapped to each block of the secure pad memory;
    a third circuit that retrieves a selected portion of the data stored in the secure pad memory;
    a fourth circuit that performs a mathematical operation on the data from the internal memory and the selected portion of the data stored in the secure pad memory;
    a fifth circuit that writes the result of the mathematical operation to the external memory;
    a sixth circuit that receives data from the external memory of the data processor engine;
    a seventh circuit that performs a mathematical operation on the data from the external memory and the selected portion of the data stored in the secure pad memory; and
    an eighth circuit that writes the result of the mathematical operation to the internal memory.

24. The MDPS of claim 23, wherein the second circuit, the third circuit, the fourth circuit, the fifth circuit, the sixth circuit, the seventh circuit, and the eight circuit are implemented as a monolithic system-on-a chip ("SoC").

25. The MDPS of claim 23, wherein each secure pad supports a plurality of virtual secure pads.

26. A non-transitory computer-readable medium having software for protecting data stored in an off-chip memory of a data processor engine, the computer-readable medium comprising:
    logic configured for preloading a secure pad memory with predetermined data;

logic configured for receiving stored data from an internal memory of the data processor engine;

logic configured for retrieving a selected portion of the predetermined data stored in the secure pad memory, wherein the secure pad memory includes a plurality of secure pads, wherein the secure pad memory and data processor engine including the internal memory are part of an integrated circuit chip, wherein the off-chip memory is not part of the integrated circuit chip, wherein communications between the internal memory and the off-chip memory are scrambled by the predetermined data of the secure pad memory, wherein the preloading logic generates a plurality of random numbers, each number being sized for a secure pad of the plurality of secure pads, wherein the preloading logic loads the plurality of random numbers into the plurality of secure pads, wherein each secure pad has a single block, wherein each block of the internal memory is mapped to each block of the secure pad memory, wherein each block of the off-chip memory is mapped to each block of the secure pad memory, wherein a size of each secure pad is the same as the size of each block of the internal memory and the size of each block of the off-chip memory;

logic configured for performing a mathematical operation on the stored data from the internal memory and the selected portion of the predetermined data stored in the secure pad memory; and logic configured for writing the result of the mathematical operation to the external memory.

\* \* \* \* \*

UNITED STATES PATENT AND TRADEMARK OFFICE
CERTIFICATE OF CORRECTION

| | | |
|---|---|---|
| PATENT NO. | : 8,578,116 B2 | Page 1 of 1 |
| APPLICATION NO. | : 11/393164 | |
| DATED | : November 5, 2013 | |
| INVENTOR(S) | : Chen et al. | |

It is certified that error appears in the above-identified patent and that said Letters Patent is hereby corrected as shown below:

In the Claims

Claim 2, Column 10, line 29, replace "the first, content" with -- the first content --

Claim 7, Column 10, line 45, replace "wherein a particular Hock" with -- wherein a particular block --

Signed and Sealed this
Fourth Day of March, 2014

Michelle K. Lee
*Deputy Director of the United States Patent and Trademark Office*